United States Patent
Payer (10) Patent No.: US 10,261,898 B1
(45) Date of Patent: Apr. 16, 2019

(54) CONCURRENT MARKING OF LOCATION AND SHAPE CHANGING OBJECTS

(71) Applicant: GOOGLE INC., Mountain View, CA (US)

(72) Inventor: Hannes Payer, Munich (DE)

(73) Assignee: GOOGLE LLC, Mountain View, CA (US)

( * ) Notice: Subject to any disclaimer, the term of this patent is extended or adjusted under 35 U.S.C. 154(b) by 363 days.

(21) Appl. No.: 15/287,679

(22) Filed: Oct. 6, 2016

(51) Int. Cl.
   *G06F 12/02* (2006.01)

(52) U.S. Cl.
   CPC ...... *G06F 12/0253* (2013.01); *G06F 12/0269* (2013.01); *G06F 2212/702* (2013.01)

(58) Field of Classification Search
   CPC .......................... G06F 12/0269; G06F 12/0253
   USPC .................................................. 707/813, 820
   See application file for complete search history.

(56) References Cited

U.S. PATENT DOCUMENTS

| | | | | |
|---|---|---|---|---|
| 6,047,295 | A * | 4/2000 | Endicott | G06F 12/0269 |
| 6,098,080 | A * | 8/2000 | Endicott | G06F 12/0253 |
| 6,289,360 | B1 * | 9/2001 | Kolodner | G06F 12/0269 |
| 6,317,756 | B1 * | 11/2001 | Kolodner | G06F 12/023 |
| 6,341,293 | B1 * | 1/2002 | Hennessey | G06F 12/0269 |
| 6,490,599 | B2 * | 12/2002 | Kolodner | G06F 12/023 |
| 6,671,707 | B1 * | 12/2003 | Hudson | G06F 12/0269 |
| 6,795,836 | B2 * | 9/2004 | Arnold | G06F 11/3636 |
| 6,845,385 | B1 * | 1/2005 | Hennessey | G06F 12/0269 |
| 2001/0000821 | A1 * | 5/2001 | Kolodner | G06F 12/023 711/170 |
| 2002/0107879 | A1 * | 8/2002 | Arnold | G06F 11/3636 |
| 2017/0344473 | A1 * | 11/2017 | Gidra | G06F 12/0261 |

OTHER PUBLICATIONS

Pall, The LUAJit Wiki, New Garbage Collector, http://web.archive.org/web/20160928043626/http://wiki.luajit.org/New-Garbage-Collector (Year: 2015).*

Doligez, Damien, and Xavier Leroy. "A concurrent, generational garbage collector for a multithreaded implementation of ML." Proceedings of the 20th ACM SIGPLAN-SIGACT symposium on Principles of programming languages. ACM, 1993. (Year: 1993).*

(Continued)

*Primary Examiner* — William Spieler
(74) *Attorney, Agent, or Firm* — Morgan, Lewis & Bockius LLP (57) ABSTRACT

Aspects of the subject technology relate to concurrent marking of objects in memory. A garbage collection process accesses objects in a marking deque. The objects have status indicators which can be unmarked, pending, processing, and marked. For each object in the marking deque, the garbage collection process determines whether the object is marked. If the object is not marked, the garbage collection process determines whether the object is pending. If the object is pending, the garbage collection process sets the object to processing. The garbage collection process adds objects referenced by the object to the marking deque and determines if the object is marked. If the object is marked already, the garbage collection process removes the referenced objects from the marking deque. If the object was not marked, the garbage collection process marks the object and processes the referenced objects. A mutator process may also update the status indicators for the objects.

20 Claims, 5 Drawing Sheets

(56) References Cited

OTHER PUBLICATIONS

Lim, Tian F., Przennyslaw Pardyak, and Brian N. Bershad. "A memory-efficient real-time non-copying garbage collector." ACM SIGPLAN Notices 34.3 (1999): 118-129. (Year: 1999).*
Jones et al., "The Garbage Collection Handbook," Chapman & Hall 2012, Chapters 2 and 15 (pp. 17-30 and 307-321).

* cited by examiner

CONCURRENT MARKING OF LOCATION
AND SHAPE CHANGING OBJECTS

BACKGROUND

The present disclosure relates generally to coherency and more particularly to methods and systems for concurrent marking of location and shape changing objects in computer memory.

Automatic memory management may be utilized to manage dynamic allocation of computer memory for applications. Portions of the memory are dynamically allocated to an application for objects or other data for processing by the application. Once the application is finished processing the objects, the memory occupied by the objects no longer used by the program—garbage—may need to be reclaimed. Garbage collection refers to automatic memory management to free or deallocate garbage. However, the application may access or modify an object while a garbage collector determines whether the object is garbage.

SUMMARY

Aspects of the subject technology relate to a method and system for concurrently marking objects in memory which may change location and/or shape. The method includes accessing, by a garbage collection process, an object from a marking deque comprising one or more objects from a plurality of objects in memory, wherein each of the plurality of objects is modifiable by another process running concurrently with the garbage collection process. The method includes determining, by the garbage collection process, whether the object is in a marked state, and determining whether the object is in a pending state when the object is not in the marked state. The method includes, in response to determining the object is in the pending state, setting the object to a processing state, and, in response to setting the object to the processing state, adding an object referenced by the object to the marking deque. The method includes determining whether the object is in the marked state after adding the object referenced by the object to the marking deque. The method includes, in response to determining the object is in the marked state, removing the object referenced by the object from the marking deque. The method includes, in response to determining the object is not in the marked state, setting the object to the marked state.

Aspects of the subject technology also relate to a non-transitory machine-readable medium including instructions stored therein, which when executed by a machine, cause the machine to perform operations. The operations include accessing, by a garbage collection process, an object from a marking deque comprising one or more objects from a plurality of objects in memory, wherein each of the plurality of objects is modifiable by another process running concurrently with the garbage collection process, and each of the plurality of objects is not in an unmarked state. The operations include determining, by the garbage collection process, whether the object is in a marked state, and determining whether the object is in a pending state when the object is not in the marked state. The operations include, in response to determining the object is in the pending state, setting the object to a processing state, and, in response to setting the object to the processing state, adding an object referenced by the object to the marking deque. The operations include determining whether the object is in the marked state after adding the object referenced by the object to the marking deque, and, in response to determining the object is in the marked state, removing the object referenced by the object from the marking deque. The operations include, in response to determining the object is not in the marked state, setting the object to the marked state, and, in response to setting the object to the marked state, processing the object referenced by the object.

Aspects of the subject technology also relate to a system. The system includes one or more processors and a non-transitory computer-readable medium comprising instructions stored therein, which, when executed by the one or more processors, cause the one or more processors to perform operations. The operations include accessing, by a garbage collection process, an object from a marking deque comprising one or more objects from a plurality of objects in memory, wherein each of the plurality of objects is modifiable by another process running concurrently with the garbage collection process, and each of the plurality of objects has a status indicator indicating each of the plurality of objects is not in an unmarked state. The operations include determining, by the garbage collection process, whether the object is in a marked state by reading the status indicator of the object. The operations include determining whether the object is in a pending state when the object is not in the marked state, and, in response to determining the object is in the pending state, setting the object to a processing state by updating the status indicator. The operations include, in response to setting the object to the processing state, adding an object referenced by the object to the marking deque. The operations include determining whether the object is in the marked state after adding the object referenced by the object to the marking deque, and, in response to determining the object is in the marked state, removing the object referenced by the object from the marking deque. The operations include, in response to determining the object is not in the marked state, setting the object to the marked state by updating the status indicator, and, in response to setting the object to the marked state, processing the object referenced by the object.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

Garbage collection may run in the background, independent of but concurrently with an application. As used herein, concurrent computing may include parallel computing of processes or threads, in which each process or thread executes computations simultaneously, for example on separate processors or processor cores or distributing computation across a network. Concurrent computing may also include computing with a single processor, in which the execution steps of the concurrent processes are interleaved via time-sharing slices such that one process does not need to complete before starting the next process. Concurrent processes often share resources, such as objects in memory.

Collisions between the application and garbage collector may occur, such as when the application is accessing the object while the garbage collector is determining whether the object is garbage. For example, the garbage collector and the application may concurrently access an object, creating a situation in which either the garbage collector or the application will have to wait on the other before making progress. As garbage collection may be a time consuming and/or processing intensive process, concurrent garbage collection may cause a noticeable drop in computing performance. Alternatively, garbage collection may be paused during active application execution, such as when a user is actively browsing a webpage. Moreover, in certain computing environments, such as a JavaScript virtual machine, the JavaScript application may change the shape and/or location of the object in memory, which adds complexity to the garbage collector running concurrently with the application because changes to the object need to be synchronized with the garbage collector.

According to various aspects of the subject technology, methods and systems are disclosed for a wait-free mechanism for concurrent marking of objects in memory which can change shape and/or location. In certain garbage collection schemes, the garbage collector may use a marking scheme in which the garbage collector marks objects during a marking phase to indicate that the garbage collector has determined that the object should not be garbage collected. In a subsequent sweeping phase, any unmarked objects may be garbage collected. The marking scheme may conceptually be color-based, such that a color represents a state of the object. One color may indicate that the object is marked. In implementations, indicators, such as flags or flipped bits, may represent the different colors. The colors may be stored within the object, for example in unused bits, or in a separate data structure such as a table. The colors may also be represented by bits, numerical values, or other representations of data.

For example, a round of garbage collection starts with a marking phase. All objects may be initially WHITE, which indicates that the garbage collector has not yet determined whether the object is live, e.g. whether the memory for the object must remain allocated. The goal of the garbage collector during the marking phase is to determine which objects are not being referenced by any other objects or a root set, which means the objects are no longer being used. Objects that are referenced by another object are live whereas objects not being referenced by other objects may be garbage collected.

The garbage collector visits every object accessible from the root set. The root set may correspond to objects in an internal data structure, such as a stack or heap, which an application can access directly from the internal data structure. When the garbage collector visits an object, the garbage collector marks (e.g. sets to BLACK) the visited object, to designate that processing on the visited object is complete, which also indicates that the object is live. In other words, an object that is marked is live. Any object that is not marked is not live. The garbage collector will also visit any objects referenced by the visited object. For example the data of the visited object may reference another object, which is also marked. Any objects which remain unmarked (e.g. is not BLACK) after the marking phase may be garbage collected in a subsequent sweep phase.

When the garbage collector visits an object, the garbage collector analyzes the contents or data of the object, which may include recursively visiting fields, objects, properties, elements, etc. referenced by the visited object for marking. Thus, objects that are not referenced by the root set may still be live if referenced by another object that is referenced by the root set. In other words, the object may be considered garbage if there is no way to reach the object (e.g. the object cannot be traced back to the root set). However, other determinations of garbage may be used, such as counting a number of references to the object. Since the garbage collector will visit and mark every object that can be traced back to the root set, any object that is not visited and marked will be an object that cannot be referenced.

The following pseudocode describes a marking operation by the garbage collector in a two-color scheme:

MarkObject(object):
if (object->IsWhite( )) {
  Object->MarkBlack( );
  marking_deque->Push(object)
}

If the garbage collector is allowed to finish a round of garbage collection without interruptions or other actors or processes needing to act on the objects, such as when an application is stopped, a two-color scheme (e.g. WHITE and BLACK) may be sufficient because each object would appear only once on the marking deque. However, if the application is running concurrently with the garbage collector, the application may change a marked object, resulting in re-visiting the marked object and pushing the marked object on the marking deque. There may be an unbounded number of changes, such that the garbage collector may not be able to finish processing the marking deque. In addition, the application and garbage collector may simultaneously attempt to access the object, creating a race condition. For instance, if the garbage collector accesses an object first, the application may have to wait for the garbage collector to finish, or if the application accesses the object first, the garbage collector may have to wait for the application to finish. In such computing environments having the application run concurrently with the garbage collector, a third color, GRAY, may be used.

In a three-color marking scheme, GRAY indicates that the object is pending but will be marked and distinguishes from unmarked (e.g. WHITE) and marked (e.g. BLACK). The garbage collector may access an object referenced by the root set or another object. The object should be marked, but may also require further processing before the garbage collector finalizes the marking. For example, the object may contain references to other objects, which the garbage collector would need to process and mark. Rather than immediately processing the object and its references, the garbage collector designates the object GRAY. The GRAY object may be placed on a marking deque for the garbage collector to mark later. GRAY distinguishes from WHITE as the garbage collector knows the GRAY object will be marked later, whereas WHITE indicates the garbage collector does not know. In addition, WHITE or BLACK objects will not be in the marking deque. By applying GRAY to an object, the garbage collector does not need to immediately process the object, which may alleviate a wait situation. The application may access the object and the garbage collector may subsequently process the object when the application is no longer accessing the object.

However, in certain computing environments, the application may mutate or change the object. The application may change a location of the object in memory, add or remove fields, and/or change the size of the object, including changing the sizes of the object's fields or other data. For example, the object may contain three references to other objects, and the application may remove the first and third references. In such computing environments, the application may mutate an object after the garbage collector has visited and designated the object GRAY, but before the garbage collector has processed the object from the marking deque. In other words, the object may have changed such that the garbage collector processes the GRAY object without knowing the object has since changed. For example, the object may have changed memory location and/or size, and the data of the object may have also changed, such as any references to other objects. Undefined behavior may result from the garbage collector processing the object based on an outdated definition of the object. To avoid this undefined behavior, either the application would have to wait for the garbage collector to finish marking (e.g. setting the color to BLACK) the object, or the garbage collector would have to wait for the application to finish mutating the object. However, this may lead to unnecessarily long wait times, which may reduce computing performance.

According to aspects of the subject technology, a four-color marking scheme may be used to address waiting conditions in computing environments in which an application running concurrently with a garbage collector may also mutate objects. Four colors may be used: WHITE (corresponding to an unmarked state), GRAY (corresponding to a pending state), ORANGE (corresponding to a processing state), and BLACK (corresponding to a marked state). ORANGE indicates that the object is currently being processed. For example, the garbage collector may be currently processing the object, or the application may be currently processing the object. In a garbage collection round, an object's color may transition, by the garbage collector, from WHITE to GRAY to ORANGE to BLACK or any sub step therein, such as GRAY to ORANGE. The application may transition the object's color from WHITE to GRAY to ORANGE to BLACK, or WHITE to ORANGE to BLACK or any sub step therein.

Figure 1A:
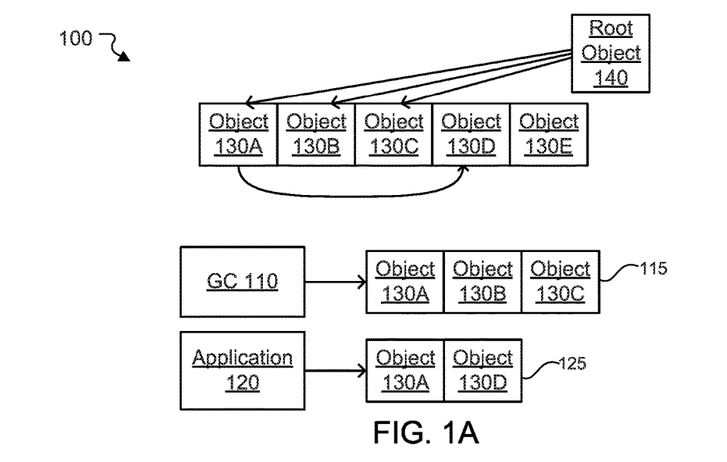
FIG. 1A illustrates a conceptual diagram of a concurrent processing environment according to example aspects of the present disclosure.

FIG. 1A shows an abstract diagram of a computing environment 100. The computing environment 100 comprises a garbage collector or GC 110 running concurrently with an application 120. An object 130A, an object 130B, an object 130C, an object 130D, and an object 130E are objects which reside in memory. Root object 140 corresponds to a root set. The root object 140 references the objects 130A, 130B, and 130C. The object 130A references the object 130D. The object 130E is not referenced. The GC 110 utilizes a marking deque 115 to keep track of objects which need to be processed. The application 120 utilizes a mutator marking deque 125 to keep track of objects which need to be mutated, such as by changing a location or shape of the object in memory. In other implementations, the mutator marking deque 125 may be the marking deque 115 rather than a separate deque. Such implementations may require synchronization for the marking deque 115.

Figure 1B:
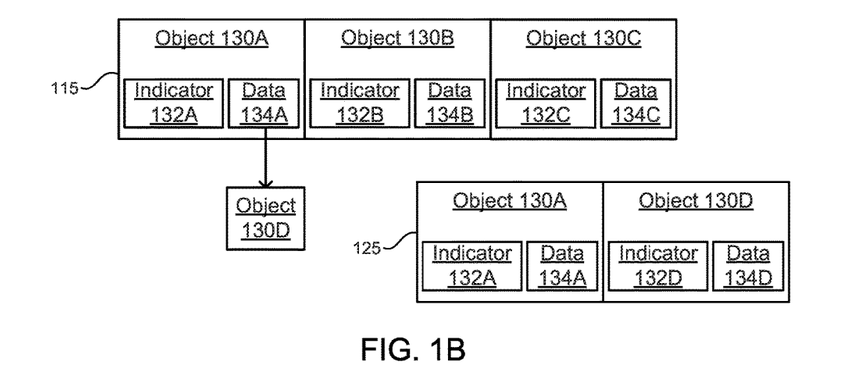
FIG. 1B illustrates a marking deque and a mutator marking deque according to example aspects of the present disclosure.

FIG. 1B shows the marking deque 115 and the mutator marking deque 125. Each object has a corresponding status indicator. In FIG. 1B, the object 130A has an indicator 132A, the object 130B has an indicator 132B, the object 130C has an indicator 132C, and the object 130D has an indicator 132D. The status indicator may be set to one of four values: a first value (e.g. WHITE) corresponding to an unmarked state that indicates the object has not been processed; a second value (e.g. GRAY) corresponding to a pending state that indicates that the object will be processed; a third value (e.g. ORANGE) corresponding to a processing state that indicates the object is being processed; and a fourth value (e.g. BLACK) corresponding to a marked state that indicates that the object has been processed or marked. Although FIGS. 1A-1C conceptually depict an object being in the marking deque 115 and/or the mutator marking deque 125, the marking deque 115 and the mutator marking deque 125 may contain pointers to the objects rather than the objects themselves or copies of the objects. Thus, The GC 110, the application 120, and/or another process or thread may modify the status indicator for any object. However, only one process or thread may modify the status indicator at any given time.

Each object also includes data. In FIG. 1B, the object 130A has data 134A, the object 130B has data 134B, the object 130C has data 134C, and the object 130D has data 134D. The data represents data associated with the object and may include values, other objects in memory, properties, elements, pointers to other fields or objects, etc. For example, the data 134A may include the object 130D or a pointer to the object 130D such that the object 130A references the object 130D, as seen in FIGS. 1A and 1B. When the GC 110 visits an object, the GC 110 determines whether the data includes or references other objects in memory which may need to be processed and marked. Objects referenced in the data may be placed on the marking deque 115 to be visited later, much like another object in the marking deque 115. For example, in FIG. 1C, the data 134A of the object 130A may be placed on the marking deque 115 when the GC 110 visits the object 130A. Although FIG. 1C conceptually shows the data 134A as being added to the marking deque 115, not all of the data 134A may be added. The object 130D and other objects referenced by the data 134A may be added rather than the data 134A itself.

Because the GC 110 runs concurrently with the application 120, the GC 110 may end up processing an object at the same time as the application 120. For example, in FIG. 1B, the object 130A is in both the marking deque 115 and the mutator marking deque 125. If the application 120 is mutating the object 130A while the GC 110 is processing the object 130A for garbage collection, collisions may occur. More significantly, errors may occur if, for example, the application 120 removes the reference to the object 130D from the data 134A while the GC 110 still assumes the reference to the object 130D is valid.

In a round of garbage collection, the objects may all start as WHITE at the start of a marking phase. The GC 110 looks at all objects that are referenced by the root object 140 to determine if they need to be processed. If the GC 110 sees a WHITE object referenced by the root object 140, the GC 110 will transition the object from WHITE to GRAY and place the object in the marking deque 115 for processing later. For example, in FIG. 1, the objects 130A, 130B, and 130C are initially placed in the marking deque 115, and have their status indicators 132A, 132B, and 132C set to GRAY. Although the object 130D is referenced by the object 130A, because the root object 140 does not directly reference the object 130D and the GC 110 has not yet processed the object 130A to recognize the reference to the object 130D, the object 130D is not yet in the marking deque 115.

Figure 2:
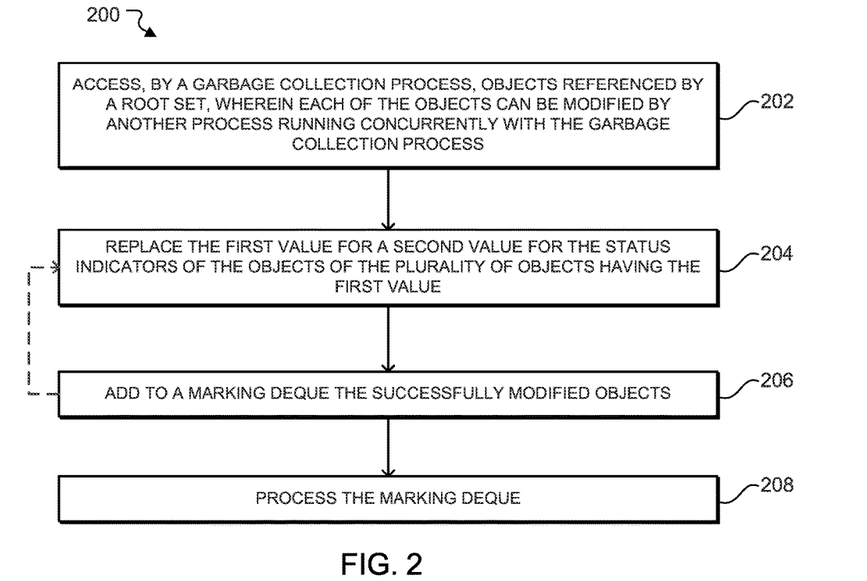
FIG. 2 is a flowchart illustrating a process for adding objects to a marking deque according to example aspects of the present disclosure.

FIG. 2 depicts a process 200 for adding objects to the marking deque during a marking phase, according to aspects of the subject technology. At block 202, a garbage collection process accesses objects that are referenced by the root set, for example by looking up references to the contents of a heap. Each object can be modified by an application process or other processes running concurrently with the garbage collection process. In FIG. 1A, the GC 110 starts a round of garbage collection with a marking phase, in which all objects 130A-130E start with the status indicators 132A-132E set to the unmarked status, e.g. WHITE. The GC 110 accesses the objects 130A, 130B, and 130C which are directly referenced by the root object 140. The application 120 runs concurrently with the GC 110 and is able to access and modify any of the objects 130A-130E, including the status indicators 132A-132E, while the GC 110 is running. For example, the application 120 may change the statuses, although the application 120 may be restricted to the transition order described above.

At block 204, the garbage collection process transitions the objects accessed in block 202 from the unmarked status to the pending status. In FIG. 1, the GC 110 will attempt, for instance, a compare-and-swap (CAS) operation to replace the WHITE for GRAY. In a CAS operation, the contents of a memory location (e.g. status indicator) are compared to a given value (e.g. WHITE), and only if they are the same, modified to a new value (e.g. GRAY). The CAS operation will fail if the status indicator did not originally read WHITE at the start of the CAS operation, for example if the application 120 updated the value before the GC 110. The CAS operation will also fail if the GC 110 did not change the status indicator to GRAY, for example if the GC 110 was locked out because the application 120 was accessing/modifying the status indicator. The CAS operation is an atomic operation, enforced by excluding other concurrent processes from accessing the resources involved, such that the atomic operation appears instantaneous.

At block 206, the garbage collection process adds the successfully modified objects to a marking deque associated with the garbage collection process. If the GC 110 successfully completes the CAS operation on an object, the GC 110 adds that object to the marking deque. Failure of the CAS may indicate that the object is being or has already been processed by another process. For example, another GC process may have already transitioned the object to GRAY and placed the object in the marking deque or other similar deque. Although the marking deque 115 is associated with the GC 110, the marking deque 115 may be accessed by other processes, such as another concurrent GC process or thread.

The blocks 204 and 206 may repeat for each object 130 until the GC 110 has accessed and attempted the CAS on all objects referenced by the root object 140. The number of repeated attempts may be bounded because progress in guaranteed; therefore the process 200 is wait-free. Objects that are still WHITE may either be garbage, or may be referenced by other objects which have yet to be processed. At block 208, the garbage collection process processes the marking deque. The GC 110 will process the marking deque 115, described further below.

The application 120 runs concurrently with the GC 110. The application 120 may need to mutate certain objects during the round of garbage collection. The application 120 mutates the objects and accordingly places the objects in the mutator marking deque 125 to be marked later. For example, in FIG. 1, the objects 130A and 130D are placed in the mutator marking deque 125. However, the application 120 may mutate the objects as needed, without regard to the GC 110 or the status indicators 132. In other words, the application 120 may mutate the objects before, during, or after performing the marking protocol, because the mutating is orthogonal to the marking. As will be described further below, in certain implementations, the GC 110 will not visit an object that the application 120 mutates because the GC 110 will assume that the application 120 will visit the object.

Figure 3:
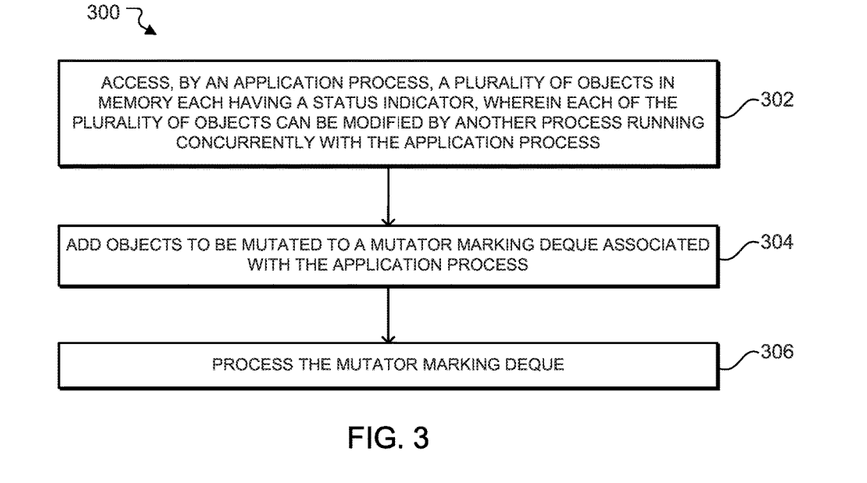
FIG. 3 is a flowchart illustrating a process for adding objects to a mutator marking deque according to example aspects of the present disclosure.

FIG. 3 depicts a process 300 for adding objects to a mutator marking deque, according to aspects of the subject technology. At block 302, an application process accesses a plurality of objects. Each of the plurality of objects can be modified by a garbage collection process running concurrently with the application process. In FIG. 1, the application 120 accesses the objects as needed. Unlike the GC 110, the application 120 does not necessarily need to access the objects based on the root object 140. Moreover, the application 120 may create new objects and change the references between objects and/or the root object 140 as needed. In certain implementations, the application 120 will mutate the objects when accessing the objects.

At block 304, the application process adds objects to be mutated (or objects that have been mutated) to a mutator marking deque associated with the application process. In FIG. 1, the application 120 has added the objects 130A and 130D to the mutator marking deque 125. As the application 120 runs, the application 120 tracks which objects are to be mutated and accordingly adds these objects to the mutator marking deque 125. The application 120 may add objects to the mutator marking deque 125 regardless of the values set in the status indicators. However, in certain implementations, the application 120 may confirm that the status indicators are not WHITE.

At block 306, the application process processes the mutator marking deque. In certain other implementations in which the application 120 has not already mutated the objects, the application 120 will mutate the objects. The mutator marking deque 125 is associated with the application 120. However, in certain implementations, other processes may have access to the mutator marking deque 125. For example, the GC 110 may access the mutator marking deque 125 after processing the marking deque 115.

Returning to the GC 110 in FIG. 1A, once the GC 110 has added objects to the marking deque 115, the GC 110 will process the objects in the marking deque 115. The following pseudo-code describes how the GC 110 can process each object in the marking deque 115, according to aspects of the subject technology:

Garbage collector—Marker:
1: do {
2: color=object.color( );
3: if (color==BLACK) return;
4: if (color==GRAY &&
5: CAS(&object.color( ), GRAY, ORANGE)) break;
6: if (color==ORANGE) break; // OR optionally return depending on the policy
7:} while (true);
8: old_top=marking_deque.top( );
9: marking_deque.push_all_pointers(object);
10: if (!CAS(&object.color( ), ORANGE, BLACK))
11: marking_deque.set_top(old_top);
12: else
13: visit_pointers(old_top, marking_deque.top( ));

The GC 110 proceeds by visiting each object in the marking deque 115. For each object in the marking deque 115, the GC 110 first retrieves the color of the object from the status indicator. If the color is BLACK, the object has already been marked and processed. BLACK indicates that the object is live (e.g. not to be garbage collected) and the GC 110 no longer needs to process the object for the current round of garbage collection. If the color is BLACK, the GC 110 may continue to the next object in the marking deque 115.

If the color is GRAY, the GC 110 may attempt to transition from GRAY to ORANGE. The transition may be performed through an atomic operation, such as a CAS operation. The transition to ORANGE may fail if another process, such as the application 120 or another GC thread, has changed the color since the GC 110 retrieved the color. For example, between the time the GC 110 read the status indicator and the time the GC 110 starts the CAS operation, the status indicator may have already been set to ORANGE or BLACK. The transition to ORANGE may also fail if another process has a lock on the object, for example processing the object with an atomic operation such as a CAS operation. If the transition fails, the GC 110 retries the processing by retrieving the color again, repeating the check for BLACK described above. Because progress is guaranteed, the number of repeats may be bounded, such as two repeats. If the transition to ORANGE succeeds, the processing continues.

If the color is ORANGE, the processing continues. Since the color is now ORANGE, either because the retrieved color was ORANGE or the transition to ORANGE succeeded, the object is recognized as currently being processed. The GC 110 expands the object and places the object's contents, such as the data, in the marking deque 115. The data may contain references to other objects which may need to be processed later. However, rather than adding all the data of the object to the marking deque 115, only the references to the other objects may be added. In certain implementations, the GC 110 may continue to the next object if the color is ORANGE, essentially allowing whichever process that transitioned to ORANGE to complete the processing and transition to BLACK.

Once the object's data is added to the marking deque 115, the GC 110 attempts to transition the object from ORANGE to BLACK. If the attempt succeeds, the object is marked and processed, and the GC 110 may visit the data. The GC 110 may then continue to the next object in the marking deque 115. However, if the attempt fails, the previously-added data is removed from the marking deque 115. The attempt may fail if another process transitions the object to BLACK before the GC 110. Since the application 120 may have marked the object, which indicates that the object may have been subject to mutation, the object's data that was previously placed in the marking deque 115 may no longer be valid. For example, references to other objects may have been added or removed.

Figure 4:
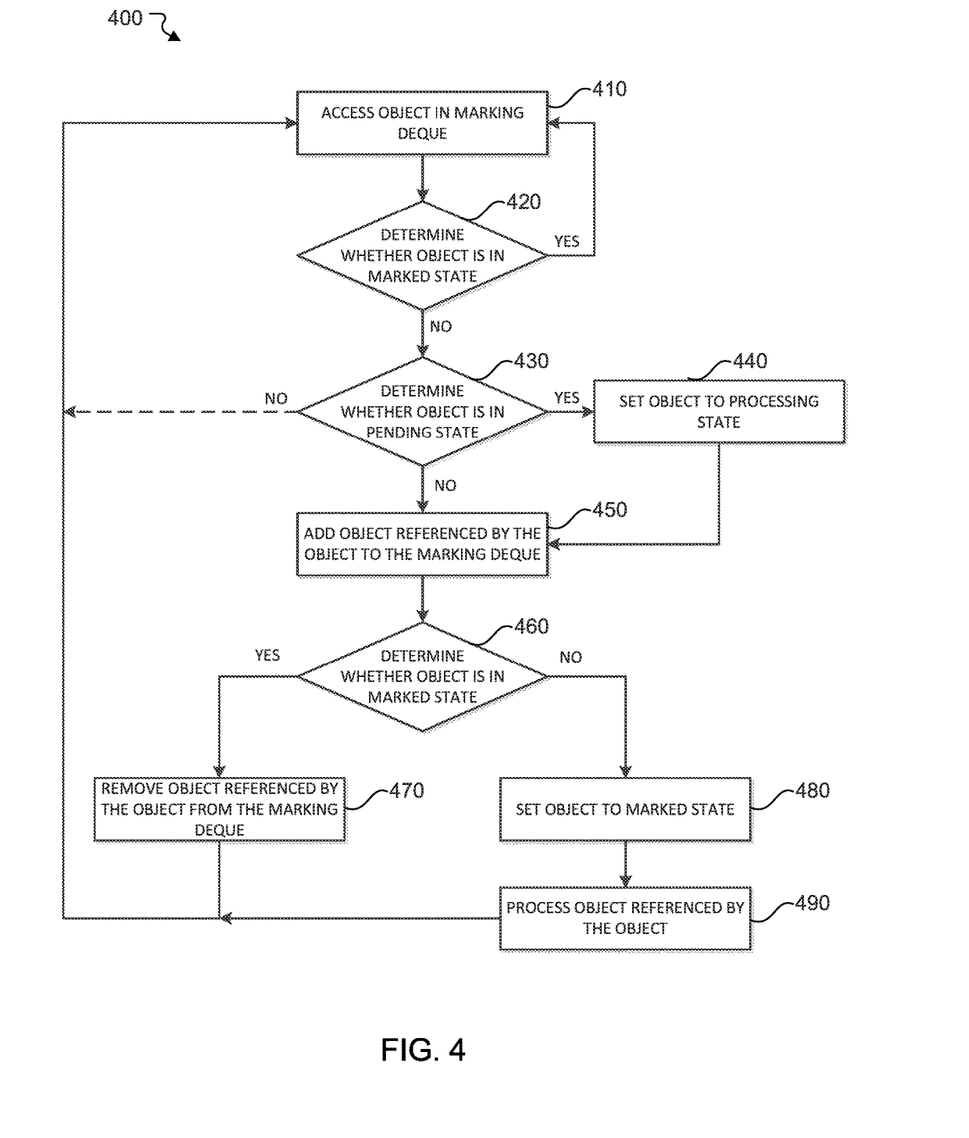
FIG. 4 is a flowchart illustrating a process for marking objects according to example aspects of the present disclosure.

FIG. 4 depicts a process 400 for processing the marking deque, according to aspects of the subject technology. At block 410, the garbage collection process accesses an object in the marking deque, which may be the next object in the marking deque. The objects in the marking deque may be one or more objects in memory which are modifiable by another process running concurrently with the garbage collection process. In FIG. 1A, the GC 110 accesses a next one of the objects 130A-130C in the marking deque 115.

At block 420, the garbage collection process determines if the object is in the marked state. For example, if the GC 110 is accessing the object 130A, the GC 110 reads a current value of the status indicator 132A to determine if the object 130A is in the marked state (e.g. the current value is BLACK).

If the GC 110 was acting in isolation, the current value would presumably be GRAY, as the GC 110 transitions objects from WHITE to GRAY when the GC 110 adds the objects to the marking deque 115. As stated above, the status indicator value progression progresses from WHITE, to GRAY, to ORANGE, and finally to BLACK, without moving backwards in the progression. However, due to other concurrent processes which can modify the objects, such as the application 120, there is no guarantee that the objects in the marking deque 115 are still GRAY. For example, the GC 110 may be accessing the object 130A at the same time the application 120 is mutating the object 130A. The application 120 will mark a mutated object, updating the corresponding status indicator 132A. From the time the GC 110 pushed the object 130A onto the marking deque 115 to the time the GC 110 actually processes the object 130A, the application 120 may have already changed the status indicator 132A. Thus, the current status indicator value may be compared to GRAY, ORANGE, and BLACK. The current status indicator value is not compared to WHITE because there is no backwards progression in the values. However, in certain implementations, WHITE may be compared as an additional check.

If the current value matches BLACK, indicating the object is in the marked state, the process returns to block 410. For the GC 110, if the object is marked BLACK, the GC 110 knows that marking the object is complete, regardless of which process completed the marking. For the marking phase, the GC 110 does not need to further process an object marked BLACK, and can continue to the next object 130 in the marking deque 115. In other words, the GC 110 considers the object live if any process marked the object BLACK.

Otherwise, at block 430, the garbage collection process determines if the object is in the pending state (GRAY). If the current status indicator value does not match GRAY, in certain implementations the process 400 will proceed to block 410 to move on to the next object in the marking deque. In such implementations, if the current status indicator value does not match GRAY, and was previously determined not to match BLACK, then the current status indicator value must match ORANGE, and the garbage collection process can safely assume that whichever process transitioned the object to ORANGE will complete the transition to BLACK.

If the current status indicator value matches GRAY, at block 440 the garbage collection process sets the object to the processing state (ORANGE). For example, the GC 110 may perform a CAS operation on the status indicator to replace GRAY with ORANGE. If the CAS fails, the process 400 may return to block 420 to re-determine the status of the object. The CAS may fail because another process is updating the status indicator. However, by the time the GC 110 re-reads the status indicator, the status indicator may have a value that allows the GC 110 to proceed from block 430.

For example, between the time that the GC 110 read the status indicator 132A and the time that the GC 110 starts the CAS operation, the application 120 may have updated the status indicator 132A or locked out the GC 110 from the CAS operation. The GC 110 will re-read the status indicator 132A when retrying the CAS operation and will proceed based on the re-read value. By the time the GC 110 re-reads the status indicator 132A, the other process would have released the lock on the status indicator 132A.

After setting the object to the processing state at block 440, or if the object was not in the pending state at block 430 (e.g. the object was already in the processing state or the current status indicator value was ORANGE), the process 400 continues to block 450.

Figure 1C:
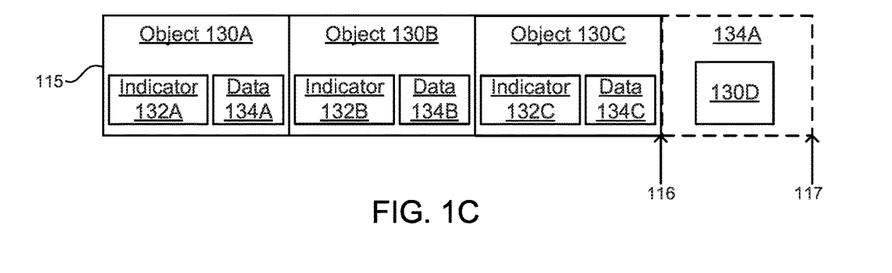
FIG. 1C illustrates pushing an object onto the marking deque of FIG. 1B according to example aspects of the present disclosure.

At block 450, the garbage collection process pushes referenced objects—objects referenced by the object—to the marking deque. In FIG. 1C, the data 134A of the object 130A is added to the marking deque 115. The data 134A may be added by copying some or all of the contents of the data 134A to the marking deque 115, or having an appropriate pointer to the memory location of the data 134A. In FIG. 1C, a first end or top of the marking deque 115 was at memory location 116, but with the addition of the data 134A, the top is now at memory location 117. Because the data 134A may reference another object 130, such as the object 130D, the objects referenced by the data 134A are added to the marking deque 115 for further processing and marking.

The process 400 continues to block 460, wherein the garbage collection process determines whether the object is in the marked state. Since the last time the GC 110 checked the status indicator value of the object 130A, for example at block 430, another process may have updated the status indicator. The GC 110 may determine if the object 130A is in the marked state by performing a CAS operation to replace ORANGE with BLACK. If the CAS fails, then the object 130A was in the marked state, and at block 470 the referenced objects are removed from the marking deque. The data 134A may be removed, for example, by setting the top of the marking deque 115 to the memory location 116, which restores the top to the old top before the data 134A was added. The CAS failure indicates that another process was accessing the object 130A and replaced ORANGE with BLACK. However, if another process replaced ORANGE with BLACK, there is no guarantee that the GC 110 visited the object 130A in a consistent state. For example, the application 120 may have modified the object 130A, which could have also modified the object 130D or references to the object 130D, and subsequently changed ORANGE to BLACK. The data 134A that was added to the marking deque 115 at block 250 may no longer be valid. Thus, the data 134A is removed at block 470.

If the CAS succeeded, in other words at block 480 the garbage collection process set the object to the marked state, the garbage collection process processes the referenced objects at block 490. For example, the GC 110 may visit the data 134A, which may include transitioning the object 130D to GRAY. The GC 110 may then subsequently process and mark the data 134A similar to an object in the marking deque 115.

From block 470 or block 490, the process 400 returns to block 410. Regardless of which process marked the object 130A BLACK, the GC 110 considers marking the object 130A complete, and moves on to the next object 130, e.g. the object 130B, in the marking deque 115. For instance, if the application 120 mutated the object 130A and marked the object 130A BLACK, then for purposes of the current round of garbage collection, the GC 110 will consider the object 130A to be live. The application 120 would have also marked the object 130D if the data 134A maintained its reference to the object 130D.

The application 120 may run concurrently with and independent from the GC 110. The application 120 proceeds by visiting each object in the mutator marking deque 125. The following pseudo-code describes how the application 120 can process each object 130 in the mutator marking deque 125 before mutating the object 130, according to aspects of the subject technology:

Mutator:
1: do {
2: color=object.color( );
3: if (color==BLACK) return;
4: if (color==ORANGE) break;
5: if (CAS(&object.color( ), GRAY, ORANGE)) break;
6:} while (true);
7: Visit(object, &mutator_marking_deque)
8: CAS(&object.color( ), ORANGE, BLACK);

For each object in the mutator marking deque 125, the application 120 retrieves the color of the object. If the color is BLACK, the object has already been marked and processed. If the color is BLACK, the application 120 can assume that any other process needing to process the object, such as the GC 110, has already finished processing the object and the application 120 may continue on with mutating the object.

If the color is ORANGE, the application 120 also continues with processing the object. If the color is ORANGE, the application 120 can assume that any other process needing to process the object, such as the GC 110, has already transitioned the object to ORANGE. Because the GC 110 determines consistency of the state of the object based on being able to transition from ORANGE to BLACK, the application 120 may safely proceed. Whichever process performs the transition to BLACK will determine how the GC 110 proceeds. For example, if the GC 110 ultimately performs the transition, then the GC 110 has finished processing the object before the application 120 mutates the object. However, if the application 120 ultimately performs the transition, the GC 110 will stop processing the object for the current round of garbage collection.

Otherwise, if the color is not BLACK or ORANGE, the application 120 attempts to transition from GRAY to ORANGE. If the transition succeeds, the application 120 continues with processing the object. Failure to transition from GRAY to ORANGE may indicate that another process, such as the GC 110, is currently making progress on the object. If the transition from GRAY to ORANGE fails, the application 120 will re-read the status indicator, for example by repeating the while loop. The number of repeats may be bounded, for example two repeats, because progress is guaranteed. In other words, the application 120 may wait until the object has transitioned to ORANGE or BLACK before continuing with the processing.

Continuing with the processing, the application 120 expands the object and places the object's data in the mutator marking deque 125. The data may comprise an object that needs to be mutated. For example, for the object 130A, the application 120 may push the object 130D onto the mutator marking deque 125. The application 120 may visit the data 134A, which may include transitioning the object 130D to GRAY.

Once the object's data is added to the mutator marking deque 125, the application 120 attempts to transition the object from ORANGE to BLACK. The attempt may fail if another process has already transitioned the object to BLACK. In this case, since the other process, such as the GC 110, has already marked the object 130 BLACK, the application 120 can safely proceed with mutating the object. If the attempt succeeded, then the other process will see that the object is already marked BLACK and act accordingly.

The application 120 then mutates the object, which may include a shape change. The shape change may include changing a location in memory of the object, a shape of the object (e.g. a size and/or data of the object), one or more attributes or values associated with the object, fields of the object, or any other changes to the object.

Figure 5:
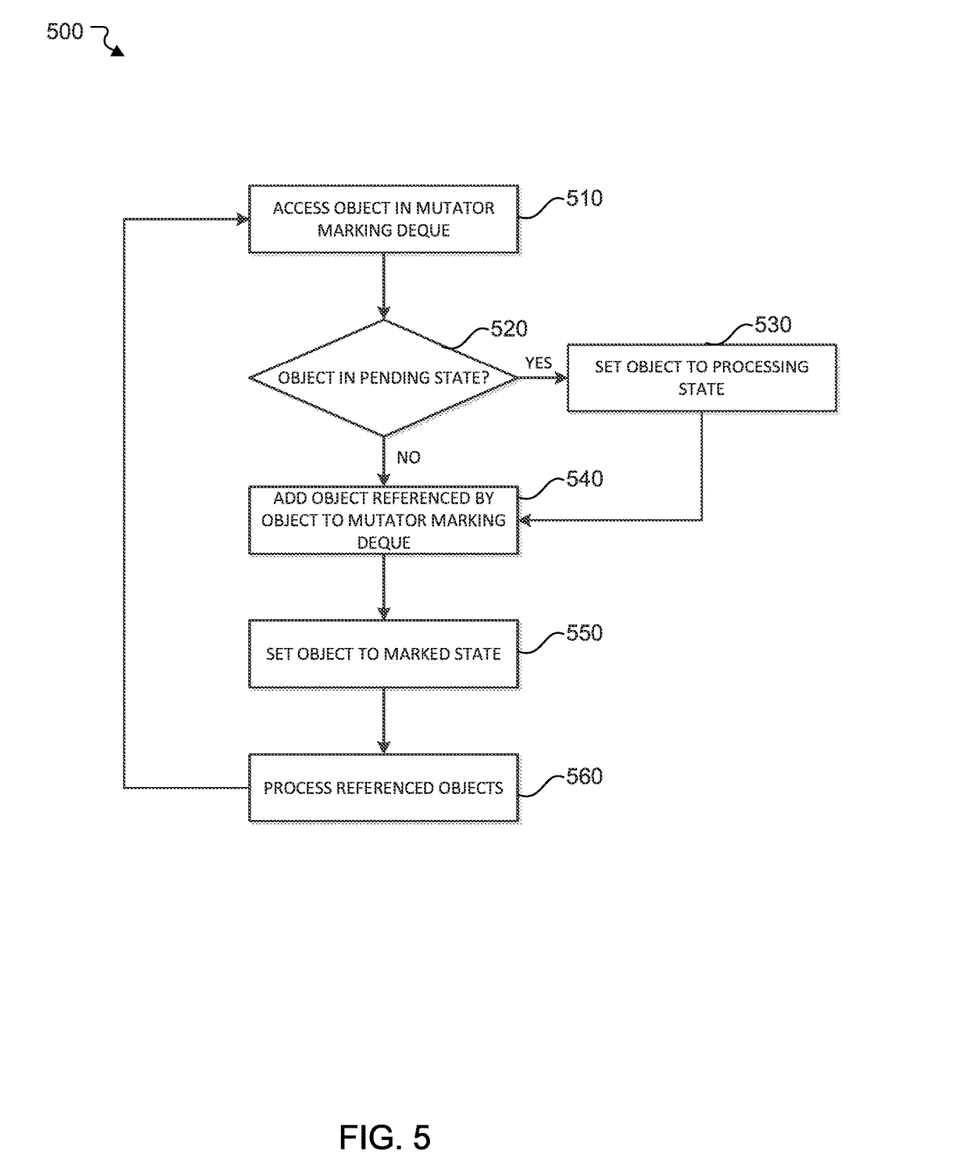
FIG. 5 is a flowchart illustrating a process for marking objects and mutating the objects according to example aspects of the present disclosure.

FIG. 5 depicts a process 500 for processing the mutator marking deque, according to aspects of the subject technology. At block 510, the application process accesses each object in the mutator marking deque. In FIG. 1A, the application 120 accesses the objects 130A and 130D in the mutator marking deque 125. The process 500 continues, for each object, to block 520.

At block 520, the application process determines if the object is in the pending state. For example, if the application 120 is accessing the object 130A, the application 120 reads a current value of the status indicator 132A to determine if the current status indicator value matches GRAY. If the object is in the pending state, at block 530 the application sets the object to the processing state. The application 120 may update the status indicator 132A for the other concurrent processes to read and act accordingly. The application 120 may set the object to the processing state (ORANGE) using a CAS operation to replace GRAY with ORANGE. The CAS may fail, for example, if the GC 110 was performing a CAS operation which locks out the application 120. The CAS may also fail if the status indicator 132A was already updated. The application 120 may retry the CAS operation such that by the time the application 120 re-reads the status indicator 132A for the CAS operation, the status indicator 132A will have a value which allows the application 120 to proceed. However, in implementations the application 120 may continue to block 540 regardless of the status indicator 132A.

At block 540, the application process adds an object referenced by the object to the mutator marking deque. For example, the data 134A of the object 130A may be added to the mutator marking deque 125. Alternatively, object 130D referenced by the data 134A may be added to the mutator marking deque 125. The application 120 may also transition any added objects to GRAY.

At block 550, the application process sets the object to the marked state. The application 120 attempts a CAS operation to replace ORANGE with BLACK. Regardless of success or failure of the CAS operation, the process 500 continues to block 560.

At block 560, the application process mutates the object. In certain implementations, if there are more objects in the mutator marking deque, the application 120 returns to block 510. By processing the mutator marking deque, the application process may speed up processing of objects. In other implementations, the application process may push the objects in the mutator marking deque onto the marking deque for the garbage collection process.

The use of the four-color scheme enables the GC 110 to determine whether the object 130 is in a consistent state and therefore safe to visit. In particular, the transition from ORANGE to BLACK enables this determination. If the GC 110 succeeds in transitioning the object from ORANGE to BLACK, the GC 110 will know that the object 130 has not changed. If the GC 110 fails in transitioning the object from ORANGE to BLACK, the GC 110 will know that the object has been processed elsewhere, and no longer needs to process the object in the current round of garbage collection.

In addition, the GC 110 can make progress marking the object without waiting indefinitely on the application 120, and the application 120 can make progress mutating the object without waiting indefinitely on the GC 110. For example, in the pseudo-code above, the while loop and CAS operations guarantee progress. Both the garbage collector and the mutator (application) will have to do at most two rounds in the while loop due to failing CAS operations. Although the while loop will not loop infinitely, if the CAS operation fails in one iteration of the while loop, by the next iteration the status indicator will have been updated to a value which allows the process to proceed. Alternatively, because progress is guaranteed, the while loop may be rewritten to straight line code. Thus, the described scheme is wait-free.

Moreover, the application 120 uses its own marking deque, the mutator marking deque 125, to keep track of objects 130 that have been or will be mutated and need to be marked. In certain implementations, the GC 110 may access the mutator marking deque 125 after the GC 110 has completed processing the marking deque 115. Thus, aspects of the subject technology address concurrency issues between an application process running concurrently with a garbage collection process, and particularly when the application can change the shape or location of the objects in memory. Aspects of the subject technology may improve computer performance with more efficient processing, specifically by leveraging concurrent processing while avoiding indefinite wait periods between the concurrent processes and through more efficient memory management due to concurrent garbage collection.

In other implementations, the GC 110 and the application 120 may process the objects 130 according to the following pseudo-code:

Garbage collector—Marker:
1: do {
2: color=object.color( );
3: if (color==BLACK) return;
4: if (color==GRAY &&
5: CAS(&object.color( ), GRAY, ORANGE)) break;
6:} while (true); // This is a spin lock of ORANGE
7: Visit(object, &marking_deque);
8: CAS(&object.color( ), ORANGE, BLACK))
Mutator:

```
1: do {
2:   color=object.color( );
3:   if (color==BLACK) return;
4:   if (color==GRAY && CAS(&object.color( ), GRAY,
       ORANGE)) break;
5: } while (true); // Spin-lock if ORANGE
6: Visit(object, &mutator_marking_deque);
7: CAS(&object.color( ), ORANGE, BLACK))
```

This implementation is a lock-based version, specifically a spinlock on color. The GC 110 will wait in a loop ("spin") while waiting until a lock is available, in this case until the GC 110 successfully performs a CAS operation to transition from GRAY to ORANGE. If the color is BLACK, the GC 110 will move on to the next object as the current object has been marked. If the color is ORANGE, the GC 110 will wait. The GC 110 may wait until the color is BLACK, which essentially allows the other concurrent process to mark the object BLACK. If the color is GRAY, the GC 110 will attempt to transition to ORANGE. If the transition to ORANGE fails, the GC 110 will essentially keep trying until success, or until the other concurrent process progresses to marking the object BLACK. If the transition to ORANGE succeeds, the GC 110 will visit the contents of the object, for example by adding the data to the marking deque 115, and then transition from ORANGE to BLACK. Since the other concurrent process will also wait on ORANGE, the GC 110 will be able to progress from ORANGE to BLACK without collisions.

The application 120 also spinlocks on ORANGE. If the color is BLACK, the application 120 moves on to the next object. If color is GRAY, the application 120 attempts to transition from GRAY to ORANGE. If the transition fails, the application 120 will essentially keep trying until success, or until the other concurrent process progresses to marking the object BLACK. If the transition to ORANGE succeeds, the application 120 will visit the contents of the object, for example by adding the data to the mutator marking deque 125, transition from ORANGE to BLACK. Since the other concurrent process will also wait on ORANGE, the application 120 will be able to progress from ORANGE to BLACK without collisions. In other words, whichever process wins the race to ORANGE may progress while the other waits. The application 120 may perform the shape change before, during, or after this process.

This implementation may address collisions. However, because of the spinlocks, this implementation may exhibit indefinite waiting. In other words, there may be no progress guarantee.

In another implementation, the GC 110 and the application 120 may process the objects 130 according to the following pseudo-code:

Garbage collector—Marker:
```
1: do {
2:   color=object.color( );
3:   if (color==BLACK) return;
4:   if (color==GRAY &&
5:   CAS(&object.color( ), GRAY, ORANGE)) break;
6: } while (true); // Spin lock if orange
7: Visit(object, &marking_deque);
8: CAS(&object.color( ), ORANGE, BLACK))
```
Mutator:
```
1: do {
2:   color=object.color( );
3:   if (color==BLACK) return;
4:   if (color==ORANGE) break;
5:   if (CAS(&object.color( ), color, ORANGE)) break;
6: } while (true);
7: Visit(object, &mutator_marking_deque);
8: CAS(&object.color( ), ORANGE, BLACK))
```

In this implementation, the GC 110, but not the application 120, has a spinlock. If the color is BLACK, the GC 110 will move on to the next object as the current object has been marked. If the color is ORANGE, the GC 110 will wait. The GC 110 may wait until the color is BLACK, which essentially allows the other concurrent process to mark the object BLACK. If the color is GRAY, the GC 110 will attempt to transition to ORANGE. If the transition to ORANGE fails, the GC 110 will essentially keep trying until success, or until the other concurrent process progresses to marking the object BLACK. If the transition to ORANGE succeeds, the GC 110 will visit the contents of the object, for example by adding the data to the marking deque 115, and then transition from ORANGE to BLACK.

The application 120 does not have a spinlock on ORANGE. If the color is BLACK, the application 120 moves on to the next object. If color is GRAY, the application 120 attempts to transition from GRAY to ORANGE. If the transition fails, the application 120 will essentially keep trying until success, or until the other concurrent process progresses to marking the object BLACK. If the transition to ORANGE succeeds or if the color is ORANGE, the application 120 will visit the contents of the object, for example by adding the data to the mutator marking deque 125, transition from ORANGE to BLACK. The application 120 may perform the shape change before, during, or after this process.

In this implementation, the application 120 may make progress. However, there is no progress guarantee for the GC 110.

In yet another implementation, a special marking deque may be used for shape changing objects. The GC 110 and the application 120 pushes only shape changing objects to the special marking deque.

Figure 6:
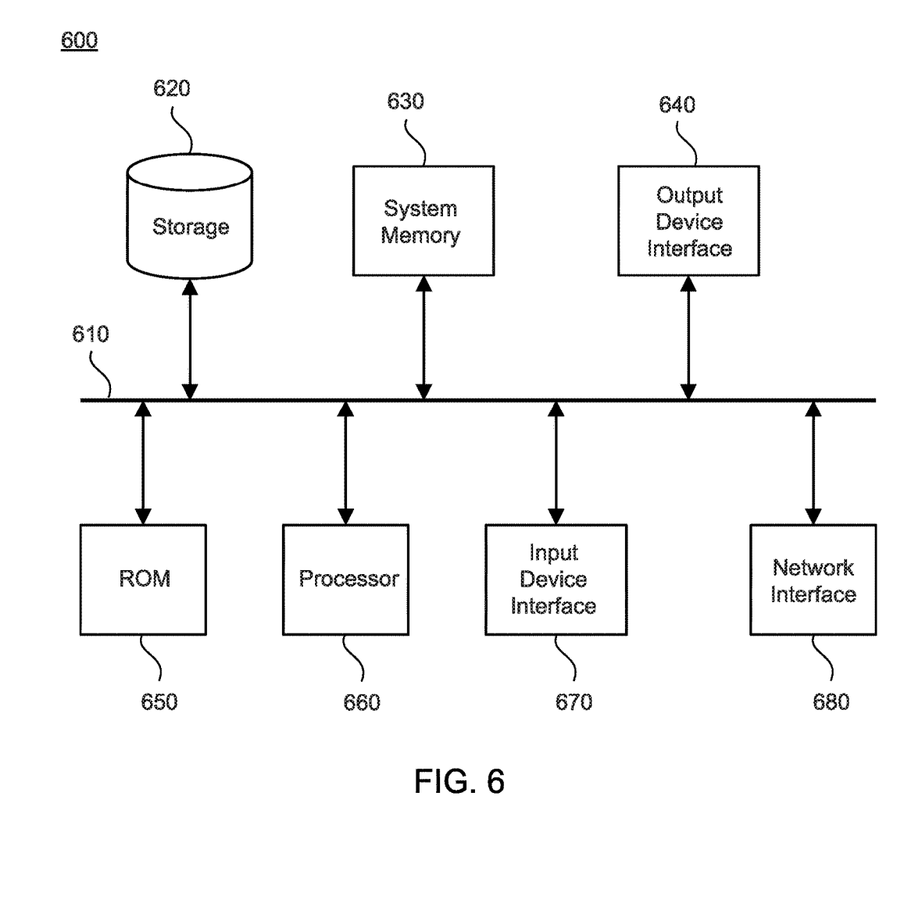
FIG. 6 shows a diagram of an electronic system according to example aspects of the present disclosure.

FIG. 6 conceptually illustrates an example electronic system with which some implementations of the subject technology can be implemented. Electronic system 600 can be a computer, phone, PDA, mobile device, or any other sort of electronic device or computing device. Such an electronic system includes various types of computer readable media and interfaces for various other types of computer readable media. Electronic system 600 includes a bus 610, processing unit(s) 660, a system memory 630, a read-only memory (ROM) 650, a permanent storage device 620, an input device interface 670, an output device interface 640, and a network interface 680.

Bus 610 collectively represents all system, peripheral, and chipset buses that communicatively connect the numerous internal devices of electronic system 600. For instance, bus 610 communicatively connects processing unit(s) 660 with ROM 650, system memory 630, and permanent storage device 620.

From these various memory units, processing unit(s) 660 retrieves instructions to execute and data to process in order to execute the processes of the subject disclosure. The processing unit(s) can be a single processor or a multi-core processor in different implementations.

ROM 650 stores static data and instructions that are needed by processing unit(s) 660 and other modules of the electronic system. Permanent storage device 620, on the other hand, is a read-and-write memory device. This device is a non-volatile memory unit that stores instructions and data even when electronic system 600 is off. Some implementations of the subject disclosure use a mass-storage device (for example, a magnetic or optical disk and its corresponding disk drive) as permanent storage device 620.

Other implementations use a removable storage device (for example, a floppy disk, flash drive, and its corresponding disk drive) as permanent storage device 620. Like permanent storage device 620, system memory 630 is a read-and-write memory device. However, unlike storage device 620, system memory 630 is a volatile read-and-write memory, such as a random access memory. System memory 630 stores some of the instructions and data that the processor needs at runtime. In some implementations, the processes of the subject disclosure are stored in system memory 630, permanent storage device 620, or ROM 650. For example, the various memory units include instructions for concurrent marking of location and shape changing objects. From these various memory units, processing unit(s) 660 retrieves instructions to execute and data to process in order to execute the processes of some implementations.

Bus 610 also connects to input and output device interfaces 670 and 640. Input device interface 670 enables the user to communicate information and select commands to the electronic system. Input devices used with input device interface 670 include, for example, alphanumeric keyboards and pointing devices (also called "cursor control devices"). Output device interfaces 640 enables, for example, the display of images generated by the electronic system 600. Output devices used with output device interface 640 include, for example, printers and display devices, for example, cathode ray tubes (CRT) or liquid crystal displays (LCD). Some implementations include devices, for example, a touchscreen that functions as both input and output devices.

Finally, as shown in FIG. 6, bus 610 also couples electronic system 600 to a network (not shown) through a network interface 680. In this manner, the computer can be a part of a network of computers (for example, a local area network (LAN), a wide area network (WAN), or an Intranet, or a network of networks, for example, the Internet. Any or all components of electronic system 600 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware, or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage, and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT or LCD monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

What is claimed is:

1. A method comprising:
   accessing, by a garbage collection process, an object from a marking deque comprising one or more objects from a plurality of objects in memory, wherein each of the plurality of objects is modifiable by another process running concurrently with the garbage collection process;
   determining, by the garbage collection process, whether the object is in a marked state;
   determining whether the object is in a pending state when the object is not in the marked state;
   in response to determining the object is in the pending state, setting the object to a processing state;
   in response to setting the object to the processing state, adding an object referenced by the object to the marking deque;
   determining whether the object is in the marked state after adding the object referenced by the object to the marking deque;
   in response to determining the object is in the marked state, removing the object referenced by the object from the marking deque; and
   in response to determining the object is not in the marked state, setting the object to the marked state.

2. The method of claim 1, further comprising:
   in response to setting the object to the marked state, processing the object referenced by the object.

3. The method of claim 1, wherein setting the object to the processing state further comprises repeating attempts by the garbage collection process to change the object from the pending state to the processing state until the object is in the processing state.

4. The method of claim 1, wherein each of the plurality of objects has a status indicator indicating whether the corresponding object is in the pending state, processing state, marked state, or an unmarked state.

5. The method of claim 1, wherein each of the one or more objects of the marking deque are not in an unmarked state.

6. The method of claim 1, further comprising:
   accessing, by the garbage collection process, the plurality of objects;
   determining whether each of the plurality of objects are referenced by a root set; and adding objects referenced by the root set to the marking deque.

7. The method of claim 6, further comprising:
setting objects referenced by the root set to the pending state before adding to the marking deque.

8. The method of claim 1, further comprising:
adding, by an application process, objects to be mutated from the plurality of objects to a mutator marking deque associated with the application process.

9. The method of claim 8, further comprising:
accessing, by the application process, a second object from the mutator marking deque;
determining, by the application process, whether the second object is in the pending state;
in response to determining the second object is in the pending state, setting the second object to the processing state;
adding an object referenced by the second object to the mutator marking deque;
setting the second object to the marked state; and
mutating the second object.

10. The method of claim 9, wherein setting the second object to the processing state further comprises repeating attempts by the application process to change the object from the pending state to the processing state until the object is in the processing state, wherein a number of repeat attempts is bounded.

11. The method of claim 9, wherein mutating the second object comprises changing a location in memory or a shape of the second object.

12. The method of claim 9, wherein the second object is the object accessed by the garbage collection process.

13. A non-transitory machine-readable medium including instructions stored therein, which when executed by a machine, cause the machine to perform operations comprising:
accessing, by a garbage collection process, an object from a marking deque comprising one or more objects from a plurality of objects in memory, wherein each of the plurality of objects is modifiable by another process running concurrently with the garbage collection process, and each of the plurality of objects is not in an unmarked state;
determining, by the garbage collection process, whether the object is in a marked state;
determining whether the object is in a pending state when the object is not in the marked state;
in response to determining the object is in the pending state, setting the object to a processing state;
in response to setting the object to the processing state, adding an object referenced by the object to the marking deque;
determining whether the object is in the marked state after adding the object referenced by the object to the marking deque;
in response to determining the object is in the marked state, removing the object referenced by the object from the marking deque;
in response to determining the object is not in the marked state, setting the object to the marked state; and
in response to setting the object to the marked state, processing the object referenced by the object.

14. The non-transitory machine-readable medium of claim 13, wherein setting the object to the processing state further comprises repeating attempts by the garbage collection process to change the object from the pending state to the processing state until the object is in the processing state.

15. The non-transitory machine-readable medium of claim 13, wherein each of the plurality of objects has a status indicator indicating whether the corresponding object is in the pending state, processing state, marked state, or an unmarked state.

16. The non-transitory machine-readable medium of claim 13, wherein the operations further comprise:
accessing, by the garbage collection process, the plurality of objects;
determining whether each of the plurality of objects are referenced by a root set; and
setting objects referenced by the root set to the pending state; and
adding objects referenced by the root set to the marking deque.

17. The non-transitory machine-readable medium of claim 13, wherein the operations further comprise:
adding, by an application process, objects to be mutated from the plurality of objects to a mutator marking deque associated with the application process;
accessing, by the application process, a second object from the mutator marking deque;
determining, by the application process, whether the second object is in the pending state;
in response to determining the second object is in the pending state, setting the second object to the processing state;
adding an object referenced by the second object to the mutator marking deque;
setting the second object to the marked state; and
mutating the second object.

18. A system comprising:
one or more processors;
a non-transitory computer-readable medium comprising instructions stored therein, which, when executed by the one or more processors, cause the one or more processors to perform operations comprising:
accessing, by a garbage collection process, an object from a marking deque comprising one or more objects from a plurality of objects in memory, wherein each of the plurality of objects is modifiable by another process running concurrently with the garbage collection process, and each of the plurality of objects has a status indicator indicating each of the plurality of objects is not in an unmarked state;
determining, by the garbage collection process, whether the object is in a marked state by reading the status indicator of the object;
determining whether the object is in a pending state when the object is not in the marked state;
in response to determining the object is in the pending state, setting the object to a processing state by updating the status indicator;
in response to setting the object to the processing state, adding an object referenced by the object to the marking deque;
determining whether the object is in the marked state after adding the object referenced by the object to the marking deque;
in response to determining the object is in the marked state, removing the object referenced by the object from the marking deque;
in response to determining the object is not in the marked state, setting the object to the marked state by updating the status indicator; and
in response to setting the object to the marked state, processing the object referenced by the object.

19. The system of claim 18, wherein the operations further comprise:
- adding, by an application process, objects to be mutated from the plurality of objects to a mutator marking deque associated with the application process;
- accessing, by the application process, a second object from the mutator marking deque;
- determining, by the application process, whether the second object is in the pending state;
- in response to determining the second object is in the pending state, setting the second object to the processing state;
- adding an object referenced by the second object to the mutator marking deque;
- setting the second object to the marked state; and
- mutating the second object.

20. The system of claim 18, wherein the operations further comprise:
- accessing, by the garbage collection process, the plurality of objects;
- determining whether each of the plurality of objects are referenced by a root set;
- setting objects referenced by the root set to the pending state; and
- adding objects referenced by the root set to the marking deque.

* * * * *